United States Patent [19]
Gould et al.

[11] 3,788,475
[45] Jan. 29, 1974

[54] CONTAINER

[75] Inventors: Joseph C. Gould; Robert L. Hayes, both of Honea Path, S.C.

[73] Assignee: The B. F. Goodrich Company, New York, N.Y.

[22] Filed: Apr. 24, 1972

[21] Appl. No.: 246,821

Related U.S. Application Data

[62] Division of Ser. No. 94,482, Dec. 2, 1970, Pat. No. 3,694,117.

[52] U.S. Cl. .................................. 210/167, 210/196
[51] Int. Cl. ............................................ B01d 33/04
[58] Field of Search ... 210/160, 167, 169, 178, 179, 210/189, 194, 196, 197, 219, 387, 400, 407, 523

[56] References Cited
UNITED STATES PATENTS
| | | | |
|---|---|---|---|
| 1,958,118 | 5/1934 | Szeguari | 210/167 X |
| 2,885,080 | 5/1959 | Goldman | 210/160 |
| 3,083,831 | 4/1963 | Fowler | 210/387 |

Primary Examiner—Frank A. Spear, Jr.
Assistant Examiner—T. A. Granger
Attorney, Agent, or Firm—Joseph Januszkiewicz

[57] ABSTRACT

A tank apparatus used in the making of surgeons' gloves wherein the tank contains interconnected compartments so that there is continuous flow of solutions therethrough. A filter is movably mounted in the tank to strain the solution as it circulates.

2 Claims, 3 Drawing Figures

CONTAINER

CROSS REFERENCE TO RELATED APPLICATIONS

This application is a division of co-pending application Ser. No. 94,482 filed Dec. 2, 1970 now U.S. Pat. No. 3,694,117.

BACKGROUND OF THE INVENTION

This invention relates to a tank used in the manufacture of dipped rubber goods and more particularly to a new and improved tank for holding circulating solutions.

In the manufacture of rubber dipped articles, such as latex rubber surgeons' gloves, considerable hand operations were essential to their manufacture thereby making the unit cost high. Although certain improvements were made in some areas of the handling of the glove forms, the improvements in manufacturing were directed principally to the manual manipulation of a single group of mandrels through several operations. Such action required complex motions with intricate mechanisms and related parts, without material improving output and cost.

The purpose of this invention is to provide a new and improved apparatus which materially increases the production and quality of latex dipped products while reducing the production costs. Further, the accuracy of reproducibility has been enhanced by this invention.

BRIEF DESCRIPTION OF THE INVENTION

The present invention is directed to a tank used in the manufacture of dipped glove forms which is cured to a final glove form wherein such tank has a plurality of compartments that are interconnected. Means are provided to force the circulation of the fluid past a screen which filters the solution as it circulates. The filter screen is movable to present additional clean surfaces for the filtering process.

DETAILED DESCRIPTION

Figure 1:
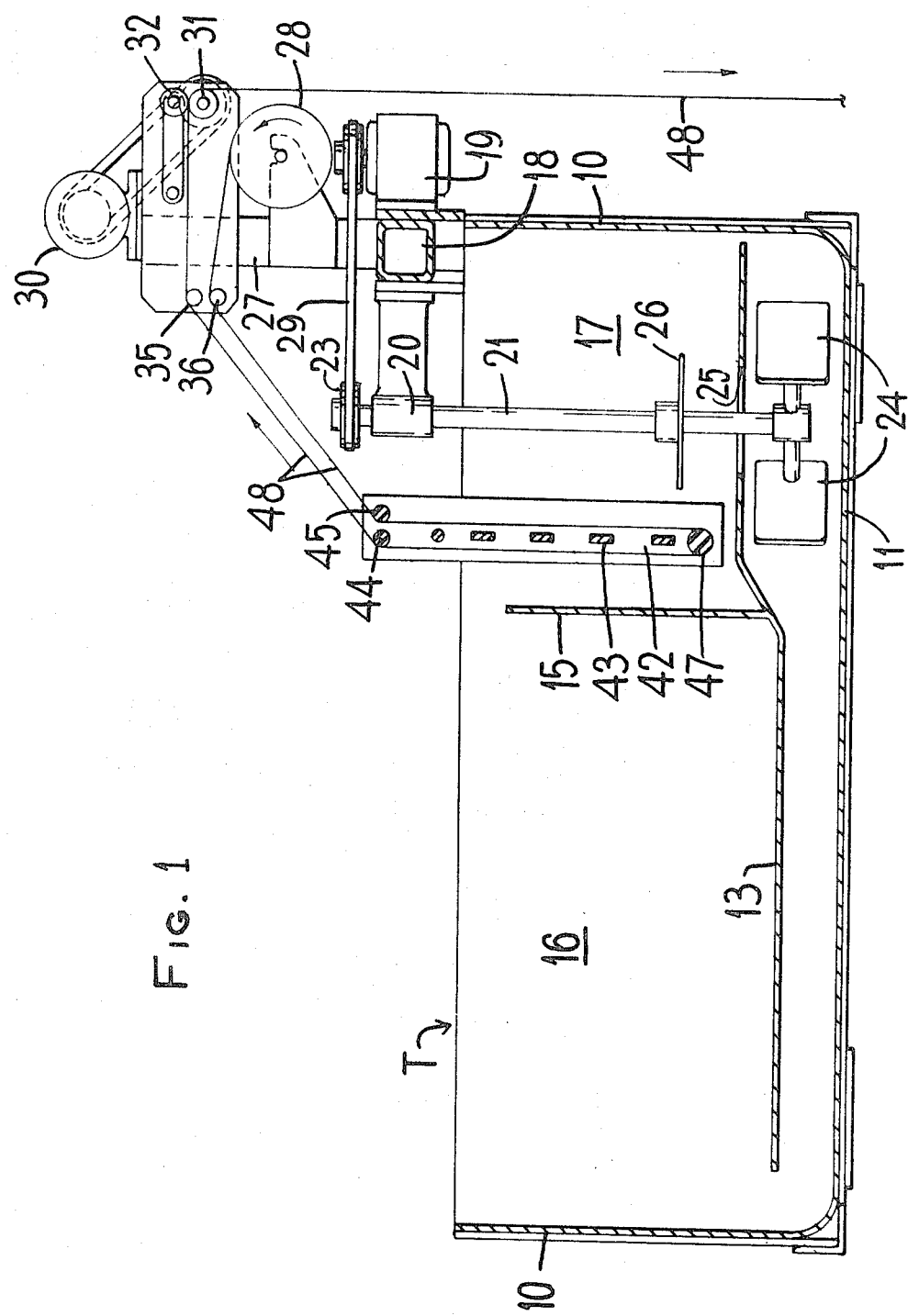
FIG. 1 is a cross-sectional view of a tank.

Referring to the drawings, and more particularly to FIG. 1, which figure is FIG. 23 in co-pending application Ser. No. 94,482 now Pat. No. 3,694,117, the structure and description of which application is incorporated herein by reference, there is shown a tank T that is a rectangular shaped vessel having end plates 10, a bottom plate 11 and side plates 12. A horizontally extending plate 13 lying closely adjacent to bottom plate 11 extends between and is secured to the respective side plates such as to provide a clearance space between plate 13 and end plates 10. A vertically extending plate member 15 is secured to plate 13 to separate the tank T in a pair of chambers or compartments 16 and 17. Support means 18 secured to the upper portion of the tank mounts a motor 19 and a bearing unit 20. A shaft 21 journaled in bearing unit 20 has a sheave 23 mounted on one end thereof and agitator blades 24 secured to the other end thereof. Plate 13 has an opening as at 25 to facilitate the flow of liquid downward through such opening 25. A plate 26 is keyed to shaft 21 closely adjacent to opening 25 to operate as a baffle. Motor 19 has its output connected via belt 29 to sheave 23 to provide power for rotating blades 24. Mounted on support means 18 is bracket means 27 which supports a filter screen supply roll 28. Bracket means 27 supports a motor 30 whose output is connected to a drive roller 31, which roller 31 is in rolling engagement with idler roller 32. A pair of closely adjacent rollers 35 and 36 are suitably mounted on bracket means 27 in line with roller 31 and supply roll 28.

Figure 2:
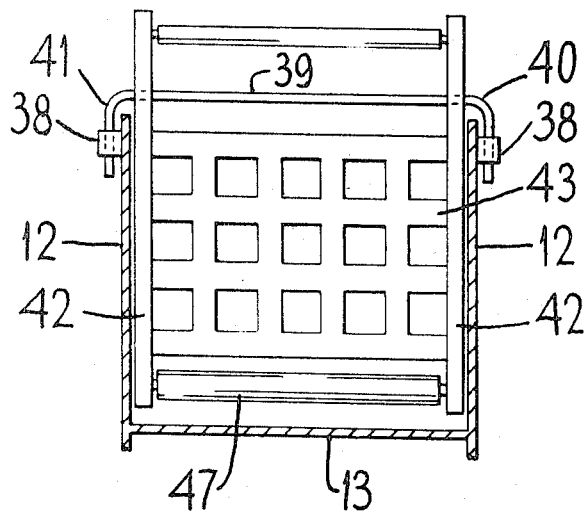
FIG. 2 is a cross-sectional view of the tank shown in FIG. 1.

A sleeve 38 (FIG. 2) is secured to the respective sides 12 of the tank T adjacent to the upper ends thereof and closely adjacent to the abutment of plate 15 to sides 12. A U-shaped support rod 39 with depending legs 40 and 41 is supported by sleeves 38. Rod 39 supports a pair of downwardly extending brackets 42, which spaced brackets 42 lie closely adjacent to the respective sides 12. Brackets 42 support a grid framework 43 which assures that the filter cloth is spaced apart as it moves off supply roll 28 and into and thence out of the tank. An idler roller 47 is mounted on the lower portion of the spaced brackets 42 closely adjacent to the lower end portion of the grid frame 43. Idler rollers 44 and 45 are mounted between the upper end portions of brackets 42, such that rollers 44 and 45 are in line with roller 47. Supply roll 28 has a supply of filter screen material 48 rolled thereon and trained for movement over roller 36, thence over roller 45 and beneath roller 47 and thence over roller 44 for movement over idler roller 35 for movement between rollers 31 and 32 from which such filter material is directed downwardly into a suitable collector unit or onto a take up roll. With the energization of motor 19, the belt 29 imparts rotation to the blades 24 via shaft 21 such as to force the liquid surrounding such blades 24 along the passageway formed by plate 13 and the bottom plate 11 into compartment 16. The displacement of the solution via blades 24 draws fluid in its direction from compartment 17 through opening 25 for propulsion along the bottom of tank T towards compartment 16. The fluid or liquid in such tank T flows from compartment 16 through the screen 48 located in compartment 17 for continuous circulation. Motor 30 being periodically energized to move the filtering screen material from supply roll 28 into the tank while the used filtering screen material is directed out of the tank over rollers 44,35 and thence away from the tank T either to the floor or onto a take-up roll.

Figure 3:
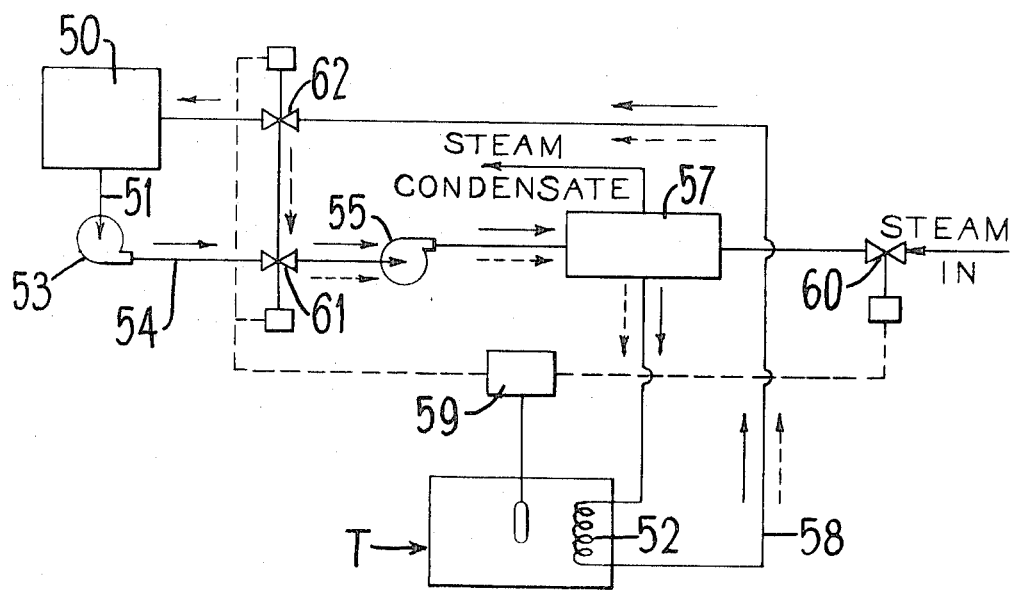
FIG. 3 is a schematic drawing of the controls for the tank.

The temperature of the liquid in the tank T is controlled by the circuit shown in FIG. 3, wherein coolant is refrigerated by a suitable chiller unit 50 for passage to a conduit 51. Conduit 51 conveys such coolant to the cooling coils 52 located in the tank via pump 53, conduit 54, pump 55 and heat exchanger 57. The coolant is thence conveyed from cooling coils 52 via conduit 58 to chiller unit 50 for cooling to a suitable temperature. A suitable temperature control monitor or temperature responsive means 59, having its probe located in tank T, controls valves 60,61,62 which in turn controls the flow of steam into the heat exchanger 57 which in turn determines the temperature of the coolant passing to coils 52. Under normal operating conditions, the temperature control liquid passes from chiller unit 50 via conduit 51, through pumps 53 and 55, and into heat exchanger 57, thence to the coils 52 within tank T. At this time, the valve 60 which controls the flow of steam into heat exchanger 57 is closed, so that no heat is imparted to the control liquid from heat exchanger 57. The cooling fluid from coil 52 is returned to the chiller 50 via conduit 58. This flow from chiller unit 50 to tank T and back to chiller unit 50 is indicated by solid arrow lines. Control monitor 59 continually monitors the temperature of tank T. Control monitor 59, upon sensing that the solution in tank T is below a present minimum, will send a signal to actuate control valves 60, 61 and 62. Actuation of valve 60 admits steam into heat exchanger 57 to heat the fluid flowing therethrough. Actuation of valves 61 and 62 blocks the flow of coolant from pump 53 and also blocks the return of coolant fluid to chiller unit 50 while simultaneously connecting the return flow of coolant from tank T via conduit 58 to valves 62 and thence to valve 61 to pump 55, where such fluid is pumped to heat exchanger 57 for subsequent flow to the coils 52 in tank T. This flow is indicated by the broken arrows in FIG. 3. Valves 61 and 62 act as by-pass valves so that the coolant fluid is continually circulated to the tank and steam is added to the heat exchanger unit only when required. In this instance, the trapped coolant fluid is recycled to the tank T and back through the heat exchanger until the tank temperature is within the preset limits and control monitor 59 re-sets valves 60, 61 and 62 to direct the fluid flow as indicated by the solid line arrows in FIG. 3.

Various modifications are contemplated and may obviously be resorted to by those skilled in the art without departing from the described invention as only a preferred embodiment has been disclosed.

We claim:

1. A tank for circulating fluid continuously therein comprising a pair of vertically extending side portions, a pair of end portions, a horizontally disposed bottom plate secured to said side portions and end portions to make a tank with an open top, a generally horizontally disposed lower plate secured to the side portions located adjacent and above said bottom plate to define a passageway therebetween, a vertically disposed plate secured to said side portions and said lower plate to divide said tank into first and second compartments above said lower plate, said lower plate having ends spaced away from said tank end portions to provide commnication between said passageway and said compartments, the top edge of said vertically disposed plate being located below the upper edge of said tank side portions to provide for communication of flow between said compartments, fluid recirculating means mounted in said passageway, drive means connected to said recirculating means that is operative upon actuation to circulate fluid in said tank from said second compartment through said passageway and through said first compartment for passage over the top edge of said vertically disposed plate and return to said second compartment, a first idler roller means in said first compartment adjacent said lower plate and adjacent to the lower portion of said vertically disposed plate, a supply roll for filter cloth, a pair of driven rolls mounted on support means above said tank, a filter cloth wound on said supply roll and guided beneath said first idler roller means and through said driven rolls for filtering fluid circulating from said second compartment to said first compartment, said filter cloth extending the full width of said first compartment, said driven rolls operative to direct an end of said filter cloth for deposit outside of said tank, bracket means mounted on said side portions of said tank and extending above said vertically disposed plate, second idler roller means mounted on said bracket means for directing said filter cloth from said second idler roller means toward said driven rollers and from said supply roll to said first idler roller means in a U-shaped configuration while passing through said first compartment, and motor means operative upon energization to drive said driven rolls to present successive portions of filter cloth from said supply roll into position in said first compartment for filtering the fluid being circulated.

2. A tank for circulating fluid as set forth in claim 1 wherein heat exchanger means are mounted in said tank, and control means are operatively connected to said heat exchanger means to maintain a predetermined temperature on solutions in said tank.

* * * * *